UNITED STATES PATENT OFFICE.

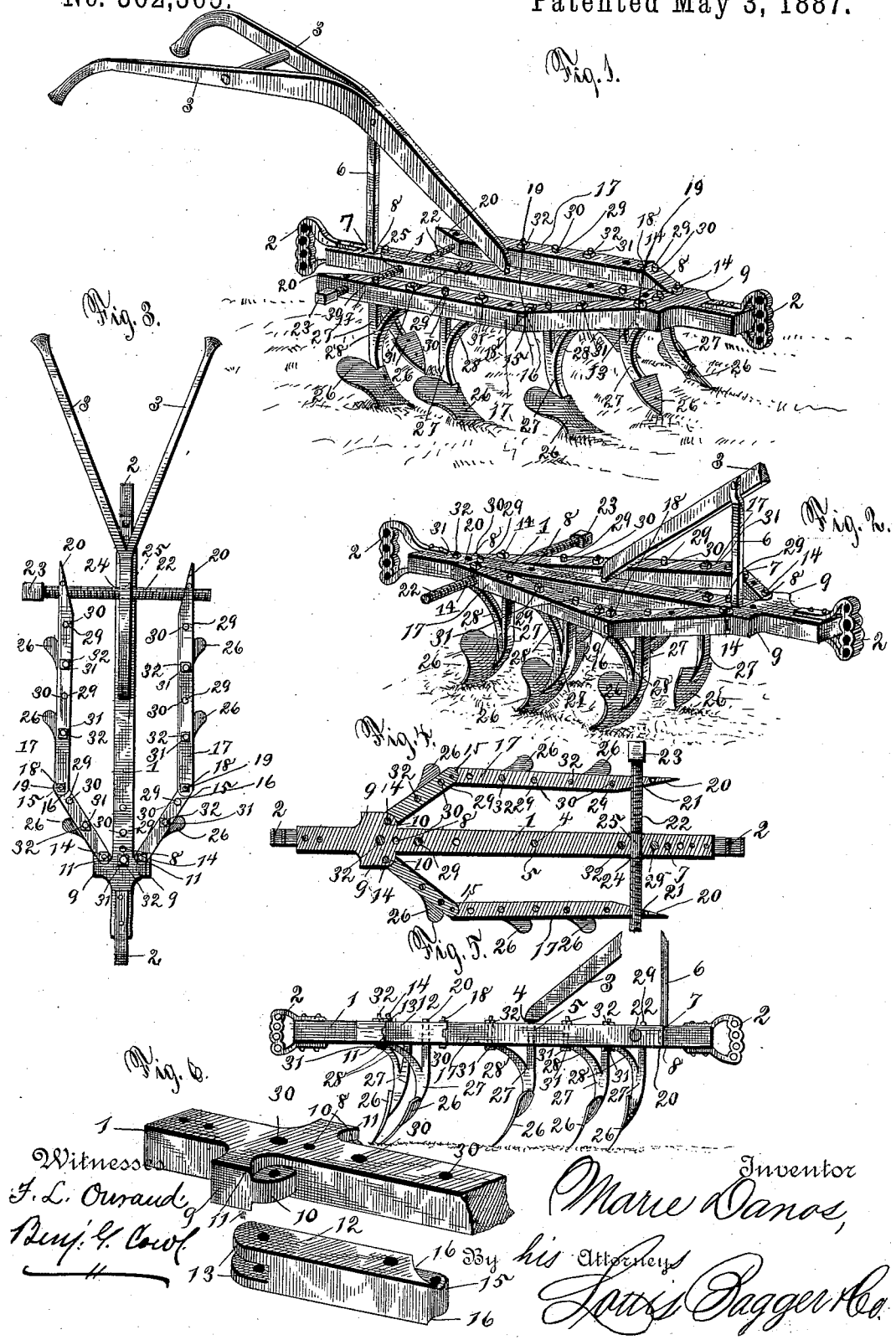

MARIE DANOS, OF NEW IBERIA, LOUISIANA.

COTTON-SCRAPER.

SPECIFICATION forming part of Letters Patent No. 362,365, dated May 3, 1887.

Application filed February 14, 1887. Serial No. 227,492. (No model.)

*To all whom it may concern:*

Be it known that I, MARIE DANOS, a resident of New Iberia, in the parish of Iberia and State of Louisiana, have invented certain new and useful Improvements in Cotton-Scrapers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cultivator or cotton-scraper. Fig. 2 is a similar view of the same, showing the handles and the plows reversed. Fig. 3 is a top plan view of the implement as shown in Fig. 1. Fig. 4 is a horizontal sectional view of the same. Fig. 5 is a side view of the implement; and Fig. 6 is a perspective view of a portion of the main beam and of the jointed side beam, showing the said side beam removed from the main beam at the joint.

Similar numerals of reference indicate corresponding parts in all the figures.

My invention has relation to that class of reversible implements for cultivating cotton or similar crops planted in rows, in which two jointed side beams are pivoted to a central main beam, and in which the handles and plows are reversible, so that the plows may stand in converging or diverging rows, and it contemplates certain improvements upon the cultivator for which I have made application, No. 225,294, on the 24th day of January, 1887, for Letters Patent; and it consists to that end in the improved construction and combination of parts of such a cultivating implement, as hereinafter more fully described and claimed.

In the accompanying drawings, the numeral 1 indicates the central main beam, which is provided at both ends with a suitable hook or clevis, 2, to which the team may be hitched in the usual manner.

The converging and united ends of two handles, 3, are provided with a downwardly-projecting pivotal bolt, 4, which is journaled in a vertical perforation, 5, in the middle of the main beam, and the handles are provided with a downwardly-projecting brace, 6, at their middles, which brace may fit with its lower shouldered end, 7, in one of two perforations, 8, in the beam at equal distances from the pivotal perforation, so that the handles may be turned either way, according to the end of the beam to which the team is attached.

The main beam is formed near one end with two laterally-projecting bulges, 9, which are formed upon their rear faces with rounded and perforated lips or ears 10, having cylindrico-concave shoulders 11 above and below them, and the forward portions, 12, of the side beams are formed with two rounded and perforated lips, 13, with which they are pivoted to the lips upon the bulges upon pins or bolts 14, the rounded lips fitting into and turning in the concave shoulders, the outer ends of the said shoulders forming stops for the said portions preventing them from being spread out too far. The other ends of the said forward or shorter portions of the side beams are formed with perforated lips 15, and with cylindrico-concave shoulders 16 above and below the lips, and the longer portions 17 of the side beams are pivoted upon bolts 18, passing through perforated lips 19 at the ends of the said longer portions, and through the lips of the shorter portions, the lips of the longer portions fitting and turning in the shoulders of the shorter portions, and the outer portions of the shoulders extending farther around the lips than the inner portions, the said portions of the shoulders will serve as a stop to the longer portions of the side beams, preventing them from being spread out too far.

The rear or free ends of the longer portions of the side beams are cut off obliquely, to fit against the sides of the main beam, as shown at 20, and the said ends have screw-threaded perforations 21, into which the screw-threaded bolt 22 fits and turns, the said bolt having a suitable head, 23, for turning it, and having its central smooth portion, 24, turning freely in a transverse perforation, 25, in the main beam.

The standards of the plows or shovels 26 consist of the standards 27 proper, and of braces 28, and the said standards are formed with reduced upper ends, 29, which may be inserted into perforations 30 in the beams, the standards being held in place and braced by means of the braces, which have perforations or eyes 31 at their ends, in which fit bolts 32, entering the under sides of the beams.

The reduced ends of the standards may revolve in the perforations, so that the plows or shovels may be reversed when the draft and the handles are reversed, allowing the plows or shovels to point in either direction.

The plows or shovels may be of any desired construction, the standards in the main beam being preferably provided with pointed opening-blades, while the standards upon the side beams are preferably provided with scrapers or plow-blades in the shape of the mold-board of a plow, although the blades may be of any other desired construction and shape, according to the class of work required of them. It will now be seen that by reversing the draft and the handles and plows the rows of plows may either converge forward or rearward, scraping the dirt toward or from the plants or rows, and by turning the screw in the free ends of the side beams the said side beams may be adjusted at different angles to the main beam, causing the implement to make a wider or narrower path, and admitting of the side beams being adjusted parallel to the main beam, or at any desired angle.

If desired, any of the plows may be removed and the remaining number employed, so that the implement may be used straddling the row or at the sides of the row, and it will be seen that by this construction of the implement it may be used for almost any purpose required in the cultivation of cotton, corn, or any other plants planted in rows.

The joints for the shorter arms of the side beams are strong by their construction and prevent the said arms from being spread too far, and the joints between the shorter and longer arms of the side beams will likewise prevent the longer arms or portions from being spread too far out, both kinds of joint being strong and durable and limiting the outward play of the said portions of the beams.

Having thus described my invention, I claim and desire to secure by Letters Patent of the United States—

In a cotton-scraper, the combination of a central beam provided at each end with means of attachment for a team, and having reversible handles secured thereto, a jointed side beam pivotally secured at one end to each side of said central beam, and having its opposite ends beveled and provided with a screw-threaded perforation, and a screw-bolt having a head upon one end and a smooth portion in its middle, journaled with its smooth portion in said central beam, the screw-threads upon the ends of said bolt being cut in opposite directions and adapted to engage with the perforations in the ends of the side beams.

In testimony that I claim the foregoing as my own I have hereunto affixed my signature in presence of two witnesses.

MARIE DANOS.

Witnesses:
JULES BAUTTE,
J. B. KER.